US006683943B2

(12) United States Patent
Wuelly

(10) Patent No.: US 6,683,943 B2
(45) Date of Patent: Jan. 27, 2004

(54) AUTOMATED MASS AUDIENCE TELECOMMUNICATIONS DATABASE CREATION METHOD

(76) Inventor: Richard A. Wuelly, 2497 Sedona Cedar Ave., Henderson, NV (US) 89052-4920

( * ) Notice: Subject to any disclaimer, the term of this patent is extended or adjusted under 35 U.S.C. 154(b) by 262 days.

(21) Appl. No.: 09/769,062

(22) Filed: Jan. 24, 2001

(65) Prior Publication Data

US 2001/0033640 A1 Oct. 25, 2001

Related U.S. Application Data

(60) Provisional application No. 60/178,195, filed on Jan. 26, 2000.

(51) Int. Cl.[7] .............................................. H04M 11/00
(52) U.S. Cl. ................................ 379/93.13; 379/92.01; 379/92.04; 379/88.18
(58) Field of Search .......................... 379/88.01, 88.18, 379/88.02, 93.13, 92.01, 92.02, 92.03, 92.04; 725/119

(56) References Cited

U.S. PATENT DOCUMENTS

| | | | |
|---|---|---|---|
| 4,100,370 A | | 7/1978 | Suzuki et al. |
| 4,941,172 A | | 7/1990 | Winebaum et al. |
| 5,218,631 A | * | 6/1993 | Katz ............................ 463/41 |
| 5,519,771 A | * | 5/1996 | Iijima ..................... 379/201.01 |
| 5,537,143 A | * | 7/1996 | Steingold et al. ............ 725/119 |
| 5,559,867 A | * | 9/1996 | Langsenkamp et al. ........ 379/69 |
| 5,625,407 A | | 4/1997 | Biggs et al. |
| 5,825,871 A | | 10/1998 | Mark |
| 5,855,516 A | * | 1/1999 | Eiba ............................. 463/42 |
| 5,889,799 A | * | 3/1999 | Grossman et al. ...... 379/266.08 |
| 5,913,196 A | | 6/1999 | Talmor et al. |
| 6,044,346 A | | 3/2000 | Ali et al. |
| 6,147,696 A | | 11/2000 | Smith et al. |
| 6,161,142 A | | 12/2000 | Wolfe et al. |
| 6,163,272 A | | 12/2000 | Goode et al. |
| 6,349,134 B1 | * | 2/2002 | Katz ........................ 379/92.01 |
| 6,447,396 B1 | * | 9/2002 | Galyean et al. ............... 463/40 |
| 6,496,567 B1 | * | 12/2002 | Bjornberg et al. ........ 379/88.02 |

OTHER PUBLICATIONS

Dialog/4 Half Size, Four Port Voice Processing Board, Product Brochure, pp. 1–11, Nov. 7, 1997.
Dialog/4 Pamphlet, Copyright 1997, by Dialogic Corporation.

* cited by examiner

Primary Examiner—Fan Tsang
Assistant Examiner—Joseph Phan
(74) Attorney, Agent, or Firm—Quirk & Tratos; Sarah Barone Schwartz

(57) ABSTRACT

A method for coordinating a generally publicly broadcast contest show with automatically dialed marketing telephone calls by which the recipients are first interrogated about their willingness to participate in the contest, and if so, they each disclose for a common data base various identifying aspects of their person. The identifying information is thereafter scanned for potential contest participant selection and once the selection is made a random number generator is used to select from these ranks the actual participants in the contest. During both the contest and in the course of collecting the particulars the keys on a telephone are used to effect interactive exchanges. In addition a voice print may be taken for positive identification. The stored particulars may also be accessed for creating marketing lists.

19 Claims, 3 Drawing Sheets

AUTOMATED MASS AUDIENCE TELECOMMUNICATIONS DATABASE CREATION METHOD

REFERENCE TO RELATED APPLICATIONS

This application claims priority to the filing date of Jan. 26, 2000 of a provisional application directed to the same matter and entitled "Automated Mass Audience Telecommunications Database Creation Method," Provisional Application Ser. No. 60/178,195.

BACKGROUND OF THE INVENTION

1. Field of the Invention

The present invention relates to interactive automated dialing systems, and more particularly to an interactive dialing system that is useful to first randomly select and thereafter communicate with a selected number of persons that may be a part of a viewing audience of a broadcast event.

2. Description of the Prior Art

Mass marketing by way of the telephone network is now an accepted practice engaged with some frequency. Its prevalence has become notorious for the bothersome interruptions of an evening by "salesmen" making "cold-calls," automatic dialing machines indiscriminately sending messages about things that are wholly uninteresting to the recipient, and other similar offensive traits. The offending nature of these calls has risen to such dimensions that legislative regulations are now in place virtually everyplace. At the core is the unfocused nature of the first sales call. It generally has nothing to do with the events that are of current interest to the recipient and is therefore perceived as nothing more than a nuisance.

At the same time various televised game shows, contests, and other gaming events have acquired extensive followings, particularly because of the matter displayed that is of wide common interest and general familiarity. The nature of the televised game shows is particularly compelling to the general public and inherently invites participation by the viewer. Because the subject matter of these televised contests is focused on the fringes of unspecialized trivial knowledge there is a large gaming component that suggests the possibility of a windfall to every viewer. The fully democratic aspect of trivia as the mechanism for a game of chance has been well appreciated. Also well appreciated have been the democratic aspects of other recent contest or competition shows that select participants from the public at large. Because of the perceived general accessibility and the chance of a win these shows have acquired immense viewer followings.

While various automated telephone arrangements and techniques are now available these have are not been used as effectively by the mass marketers as the attention garnering techniques associated with audience participation shows. Of course, public rejection of the mass marketer and annoyance over his phone calls then followed. Moreover, these same successful game shows now occupy a majority of the public attention which is so rudely interrupted by the mass marketer's call. Thus while the immense popularity of the game show has induced substantial desires for interactive participation by the viewing audience, these desires remain generally unattended. Like two ships at night two symmetrical endeavors are now proceeding in parallel, both inadvertently interfering with each other.

In each instance the threshold obstacle is the identification scheme that one needs to implement in order to properly manage any interactive system. For the purposes of a game show one may want to identify, and omit, 'ringers' from the ranks of potential contenders while the mass marketer may want to know all about his potential customer before making the call. Both, therefore, require substantial detail in the knowledge of the person called. Accordingly, a symbiosis is clearly suggested.

In the past various techniques were devised which in one way or another assure accurate identification. For example, U.S. Pat. No. 6,163,272 to Good et al. speaks of an interactive information distribution system in which, however, identifiers like a personal identification number (PIN) needs to be assigned to each participant. Alternatively, as suggested in U.S. Pat. No. 6,161,142 to Wolfe, et al., the interactive exchange is confined to a computer network system such as the Internet, and then encoded for limited access, and so on. Generally, each of the prior art interactive systems in one manner or another focuses on the system details that may be required but not on the willingness of the participant to shed his or her cloak of privacy.

In all marketing efforts the selection of the targeted consumer profile is of primary significance. Simply, substantial efficiencies can be gained if the consumer preference is specified and substantial efforts have been expended in the past in attempts at refining all sorts of lists of prospective purchasers to which any particular marketing piece may be directed. At the core is the creation of this marketing list and the annoying phone call is simply one mechanism by which such lists are currently generated.

The annoyance of this generation process has produced the general resistance to any subsequent message, particularly since the phone calls come during the favorite televised game show. Accordingly a technique that synergistically combines both aspects of the proposed symbiosis is extensively sought and it is one such technique that is described herein.

SUMMARY OF THE INVENTION

Accordingly it is the general purpose and object of the present invention to include a sales call in a solicitation to participate in a televised game show, thereby inducing willing participation by the consumer.

Other objects of the invention are to provide a technique for effecting sales calls in which the response of the recipient is stored as a voice print for future use in the course of participation in a television game show.

Yet further objects of the invention are to provide an interactive communication system by which remote viewers of a television program can participate in the course thereof.

Briefly, these and other objects are accomplished within the present invention by way of a process in which a list of willing participants in various televised game shows and other gaming events is accumulated, and thereafter sorted for demographics, interest focus and other characteristics. To insure that the participant is unambiguously identified and to determine that the participant is: (a) not related to the game production staff; (b) not specially and unfairly trained for any one of the game shows or events; and (c) not otherwise unfairly advantaged, the accumulation process extends to substantial detail. As a part of this interview process the candidate's voice print is available and may be stored along with other positively identifying data.

Once thus sorted the members of a selected subset may be further interrogated about their interest to participate in a televised game show, the interrogation process then revealing to these potential participants the fair assessment of the probabilities of their selection at any given time, and the requirement that they each view the particular game show in proximity to a telephone or that they each be near a telephone in a specific period of time when the selection for a gaming event is made. When the pool of candidates is collected a random number generator assisted selection process is invoked to select from the pool those that will be participating in the event. Accordingly, each marketing call is associated with some statistical probability of participation in a contest with the prospect of a windfall that then may follow.

The foregoing interrogation process can be fully automated, further removing the bases for inhibition. Thus a prerecorded message may first announce to the recipient of the phone call that he or she has been selected into the pool of potential participants of a televised game show, followed by the disclosures that may be required which advise the recipient of the probabilities, the potential winning pool, and any other details. Thereafter the recipient of the automatic phone call may be requested to acknowledge his willingness to participate, by way of a voice response and by pressing one or more of the keys of the telephone set, and once this acquiescence is acknowledged the verification process may compare the voice response with the participation candidate's earlier voice print or may start accumulating new voice data for a further voice print. This voice print pattern associated with the number called can then be stored along with any demographic, sociological, or other data.

This pool of potential participation candidates shall, of necessity, become a fairly predictable audience of the game show or event for which they were selected. Accordingly, a symbiotic exchange is provided where the show or event provides the common interest nexus for the sales call and the sales call, in turn, promotes the show or event. Once the lists are collected further demographic and/or societal targeting of the common interests in this pool can be refined. In this manner the character of the game show along with the advertising matter that accompanies such a show can be appropriately selected both for increased interested and also for increased effectiveness. Accordingly, by this method, cost effectiveness of the marketing and the game or event production is optimized. More importantly, the architecture of this inventive communication system is useful both in the course of accumulating the participation candidate pool and also in the subsequent interactive participation by those participants that have been selected.

DESCRIPTION OF THE PREFERRED EMBODIMENT

Figure 1:
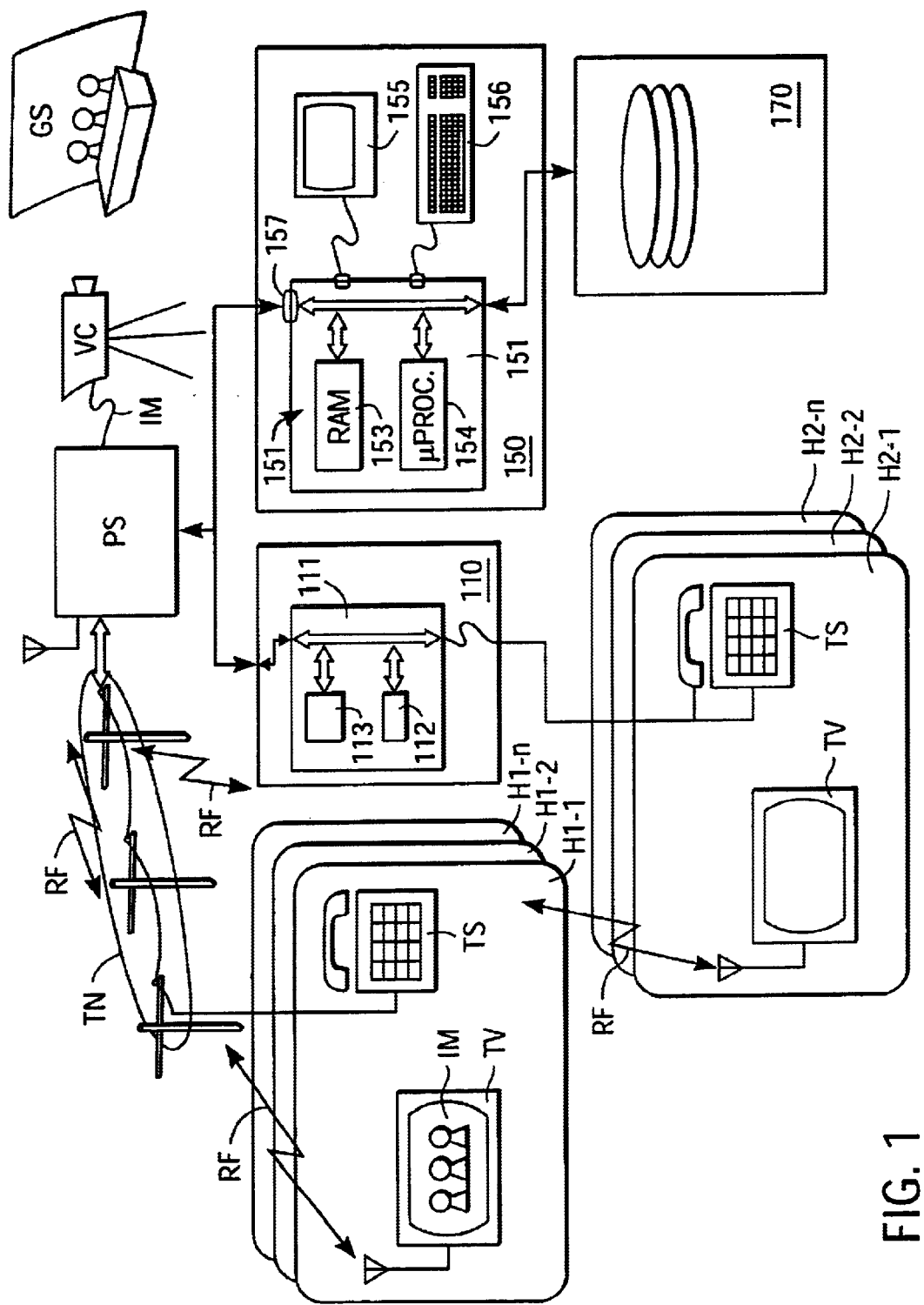
FIG. 1 is a diagrammatic illustration of an inventive communication and data storage system that is useful both in the course of collecting a candidate pool for a televised game show and also for the interactive exchanges with selected ones from said pool and the game show conductor.

As shown in FIG. 1 the inventive communication system, generally designated by the numeral 10, is organized around a conventional telephone network TN tied to a plurality of household groupings shown generally as households H1-1–H1-n through H2-1–H2-n. Like numbered parts functioning in like manner, each of the households H1-1 through H2-n is provided with a telephone system TS, which while illustrated as a single instrument may take the form of a whole array of devices that are adapted to communicate by telephone signal. Moreover, each of the households H1-1 to H2-n includes one or more television set TV receiving signals RF from one or more programming sources PS. In the illustration herein, this programming source PS is transmitting the images IM from a game stage GS captured by a video camera VC.

While the foregoing illustration suggests a separate signal configuration servicing the telephone sets TS and the television sets TV, the current path is towards integration into a single cable system. The programming source PS, therefore, is also shown connected to the telephone network TN. In this general arrangement the separate signal configurations illustrate primarily the past practices that were dictated by the development of technology and it is this coincidental separation that forms the bases for the current separation. Of course, with the currently available signal bandwidths in telephone networks this separation is an event from the past, its edges having been fully blurred by new devices.

In accordance with the present invention the programming source PS is tied to the telephone network TN, to an autodialing system 110 and to a data processing system 150 that may be provided with its own mass storage disc drive or server 170. While there are various commercially available configurations for automatic dialing systems, in the foregoing implementation the autodialing system 110 is shown as a conventional personal computer 111 provided with one or more voice processing boards 112 like those sold under the mark, model or style DIALOG/4 by the Dialogic Corporation, 1515 Route 10, Parsippany, N.J. 07054. In the configuration suggested by the manufacturer the processor 111 is programmed by a memory resident program in RAM 113 to transmit calls to the telephone network TN in accordance with the destination numbers that may be externally provided, and once the call connection is made an interactive exchange is initiated pursuant to which the call recipient is advised of his or her potential selection as a participant. This advice can be in the form of a prerecorded message stored in the voice board 112 and may then be followed by informational exchanges precisely identifying the participant. At the end this data is transferred to the server 170, along with a verification template of the recipient's voice spectrum. In this manner all the detailed information necessary to positively identify the candidate is collected and stored. This same data may also include other collateral information about the candidate's consumer preferences and the like which can then be further useful for selection to various lists.

It should be noted that the foregoing arrangement includes the processing system 150 implemented in accordance with the prevailing practice by way of a processing stage 151 provided with a bus 152 tied to a scratch pad or RAM memory 153 and a processor 154. Bus 152, through various I/O ports is tied to a video display 155 and a keyboard 156 and is further connected to the mass storage disc array of the server 170. Processor stage 151, moreover, may be tied through an interface 157 to the telephone network and to the autodialing system 110. Thus full data exchange is effected between the interactive portal of the system and the processing stage that controls the whole process.

Figure 2:
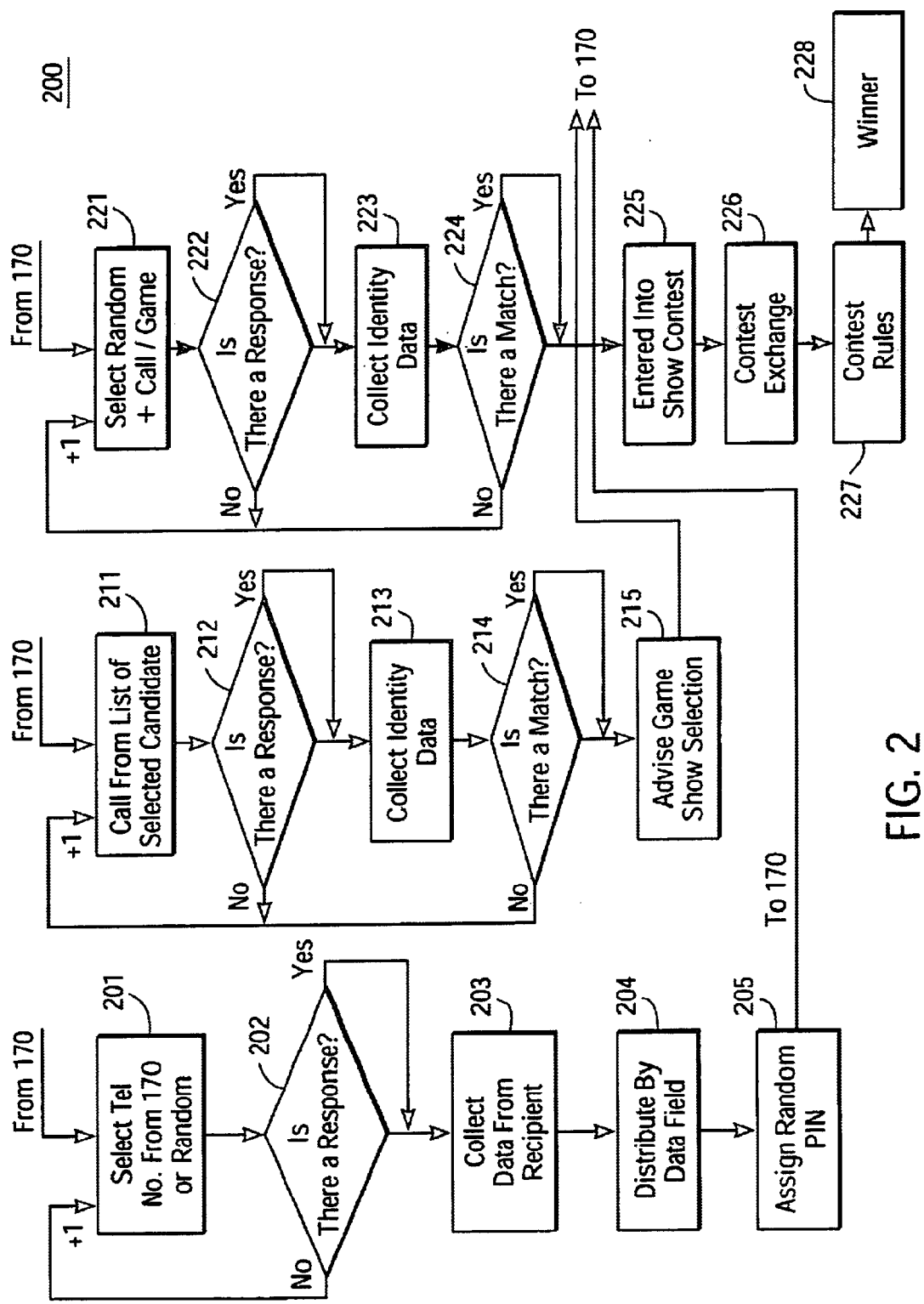
FIG. 2 is a sequence diagram, expressed as a flow chart, indicating the sequence of logical processes that are effected in accordance with the present invention.

Referring now to FIG. 2 the logical process 200 effected by the combined operations of the above autodialer 110 and the processing system 150 is shown generally by way of the sequence of steps which in step 201 initiates the first registration call to a telephone TS selected from a number list that is provided from a directory stored in memory 170, or is simply randomly generated. Preferably this call is made during the time that the event or show are occurring. If there is a cogent response (some numerical sequence keyed on the receiving telephone TS) that meets the criteria of a voice message instruction, tested in step 202, then the sequence advances to step 203 in which various pieces of information are collected about the identity, schooling, business affiliation and other details of the recipient. At the same time the recipient's voice print may be sampled. If, on the other hand, there is no cogent response, or simply no answer, then step 202 returns the sequence to the top of step 201 where the next telephone number is selected and called.

The data collected in step 203 is transferred for storage in the disc files 171 included in the server 170 where, pursuant to the instructions in step 204, it is distributed by data fields for convenient classification, searching and identity verification. This data base can then be accessed either by those that are interested in a list, and also by the game show or event producer. More precisely, in step 205 a list of candidates for a gaming event or a show is culled from the collection of all the names that have been amassed in step 204 and a random number is assigned to each of these names. This randomly generated number may also be useful as a further personal identifier or PIN.

The selected name list is then returned back to the processing system 150 where in step 211 a similar process to that described in association with step 201 is initiated. Specifically, all those on the list are called in sequence, by way of the automated dialing system 110, and the response is tested first in step 212 in a manner similar to the test in step 202. If there is an answer then in step 213 the various indicia for an identity check are assembled, including the voice print template, all of which have been earlier accumulated in the server system 170.

Those skilled in the art will appreciate that the logical functions of steps 211, 212 and 213 are substantially similar to those in steps 201, 202 and 203 and common subroutines therein can be shared between these assignments. Thus, except for several restrictions and modifications the same instruction code can be utilized. In this second telephone call cycle, however, the identity of the call recipient needs to be accurately determined as it is this identity that has been used in the course of the selection into step 211. Accordingly, in step 214 a comparison sequence is carried out by automated interrogation and at the end of the sequence the recipient is requested to utter the same words that have earlier been used to define his or her voice print template. When this verification is completed the autodialer 110 is advanced to step 215 in which the recipient is advised of the recipient's selection, the time interval of the show or event in which the recipient will receive the participation call and the probabilities of the recipient's participation in the contest or game. At the same time the recipient may be assigned further identifiers or other tasks which will be required in the course of participation.

Generally, this same process may be used in the course of the event or show. Once again automatically dialed telephone calls are made by system 110 in step 221 to those of the list of participants selected in step 215 that are picked by a random number generated match in step 216. Like in steps 212 through 215, the identities are verified in steps 222 through 225, and if verified then in step 226 an interactive exchange takes place according to the terms of the contest, shown generally as step 227. This exchange may be by live interrogation and voice response or by numerical key responses and may include interrogation about the other tasks that may have been earlier specified in step 216. In this manner various marketing endeavors can be conveniently accommodated since the variations of the other tasks can be quite broad. For example, the task may require the participation candidate to visit a store or some other business venue, or log on to a web site, and so on. The interactive exchange then terminates in step 228 which determines if there is a winning payout.

It will be appreciated that various other options and modifications in the game or contest can be effected. In each instance it is the potential of a reward or windfall which motivates the recipient to continue with the process in a setting that has all the entertainment attributes of a contest. This combination is particularly useful in garnering the attention and consent of even the most reticent ones of the consuming public.

Figure 3:
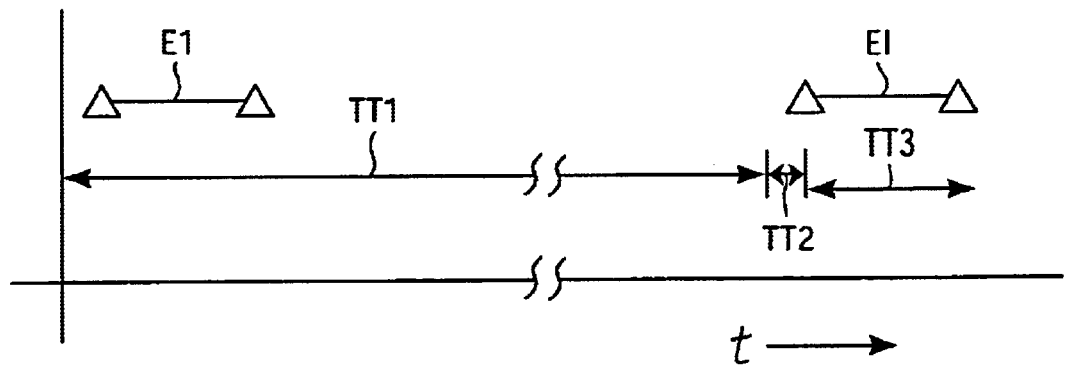
FIG. 3 is a timing chart useful in carrying out the communications associated with the inventive process.

By further reference to FIG. 3, the foregoing steps 201 through 204 can be carried out at any time preceding the time and date of the game show or event, shown as the time interval TT1, but preferably in a time interval EI of a weekly show. Steps 211 through 216, in turn, should be carried out immediately prior or right at the beginning of the event or show interval EI, shown by the time interval TT2 and steps 221 through 228 then occur in the course of the show, shown by the time interval TT3. In this manner coordination of the participant's attention with the show is assured.

Figure 4:
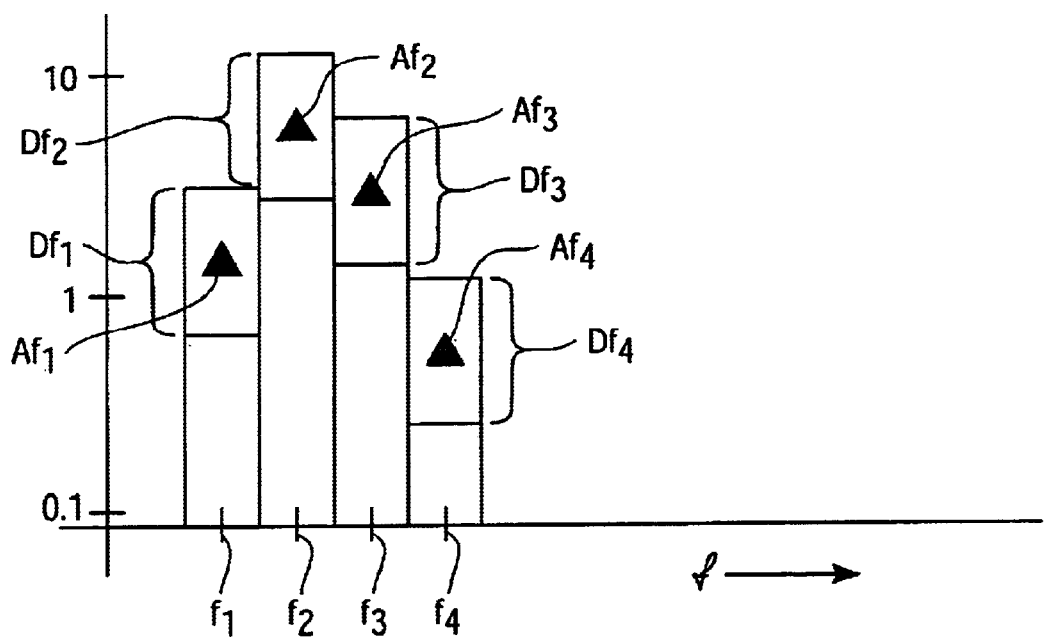
FIG. 4 is a voice print template useful with the invention herein.

While there have been various techniques developed in the prior art for obtaining and comparing voice prints, the technique utilizing the spectral signature of a particular word described in U.S. Pat. No. 4,100,370 to Suzuki et al. is suitable for the purposes herein and the teachings of said patent are incorporated in their entirety herein by reference. In accordance with the teachings of the '370 patent shown in FIG. 4 is a set of power level ranges Df1, Df2, Df3 and Df4 at frequencies f1, f2, f3 and f4 within which the frequency spectrum of a particular word needs to occur. If the actual voice sample spectrum shown as Af1, Af2, Af3 and Af4 falls into the ranges Df1–Df4 then a match is recognized.

Of course, extreme precision in voice print matching is unnecessary. Since the identification process includes all sorts of other personal information detail only a coarse voice comparison need occur. Moreover, while the teachings of the '370 patent suggest firmware implementation of the mathematical algorithms utilized in synthesis of the significant voice power spectra the same can be accomplished by way of software in the processor associated with the autodialing boards in system 110.

In this manner an interactive system is devised which encourages sharing of information in a setting that is both pleasant to the participants and economical in its implementation. Of course, the same features are useful also with radio shows and even in untransmitted, local settings.

Obviously, many modifications and variations can be effected without departing from the spirit of the invention instantly described. It is therefore intended that the scope of the instant invention be determined solely by the claims appended hereto.

It is claimed:

1. A method for combining a contest with automatically dialed telephone solicitations comprising the steps of:

initiating a first sequence of automatically executed telephone calls to a first arbitrarily selected pool of telephone recipients, each said automatically executed telephone call of said first sequence including a recorded message informing each said recipient of the time and other particulars concerning said contest and advising each said recipient that said recipient shall be eligible to be included in a list of potential contest candidates upon the recipient's indication of consent;

recording the particulars of each said recipient's identity for each said recipient that has indicated said consent to be included in said list of potential contest candidates;

initiating a second sequence of automatically executed telephone calls to first randomly selected ones on said list of potential contest candidates, each said automatically executed call of said second sequence including an interactive exchange for verifying the identity of the telephone call receiving person, said interactive exchange including comparisons with said particulars of each said recipient's identity collected in said recording step;

storing the identities of all such potential candidates as have correctly verified said particulars in a roster of candidates selected for said contest; and selecting a second random group from said roster of candidates for interactive telephonic participation in said contest.

2. A method according to claim 1, wherein:

said step of recording the particulars of each said recipient's identity includes the further step of inscribing parts of each said recipient's voice spectrum.

3. A method according to claim 2, wherein:

said contest is repetitively scheduled; and said step of initiating said second sequence of automatically executed telephone calls occurs immediately preceding each said contest.

4. A method according to claim 3, wherein:

said step of randomly selecting said second group occurs during each said contest.

5. A method according to claim 1, wherein:

said contest is repetitively scheduled; and said step of initiating said second sequence of automatically executed telephone calls occurs immediately preceding each said contest.

6. A method according to claim 5, wherein:

said step of randomly selecting said second group occurs during each said contest.

7. A method for selecting a list of participants in a gaming contest by way of an interactive automatic telephone system, comprising the steps of:

initiating a first sequence of automatically executed telephone calls to a first arbitrarily selected pool of telephone recipients, each said automatically executed telephone call of said first sequence including a recorded message informing each said recipient of the time and other particulars concerning said contest and advising each said recipient that said recipient shall be eligible to be included in a list of potential contest candidates upon the recipient's indication of consent;

recording in the course of a first interactive exchange the particulars of the recipient's identity for each said recipient that has indicated said consent to be included in said list of potential contest candidates;

initiating a second sequence of automatically executed telephone calls to first randomly selected ones on said list of potential contest candidates, each said automatically executed call of said second sequence including a second interactive exchange for verifying the identity of the telephone call receiving person, said second interactive exchange including comparisons with said particulars of each said recipient's identity collected in said first interactive exchange;

storing the identities of all such potential candidates as have correctly verified said particulars in a roster of candidates selected for said contest; and selecting in the course of said contest a second random group from said roster of candidates for interactive telephonic participation in said contest.

8. A method according to claim 7, wherein:

said step of recording the particulars of each said recipient's identity includes the further step of inscribing parts of each said recipient's voice spectrum.

9. A method according to claim 8, wherein:

said contest is repetitively scheduled; and said step of initiating said second sequence of automatically executed telephone calls occurs immediately preceding each said contest.

10. A method for selecting a list of participants in a repetitively scheduled generally broadcast gaming contest by way of an interactive automatic telephone system, comprising the steps of:

initiating a first sequence of automatically executed telephone calls to a first arbitrarily selected pool of telephone recipients during the scheduled periods of said contest, each said automatically executed telephone call of said first sequence including a recorded message informing each said recipient of the time and other particulars concerning said contest and advising each said recipient that said recipient shall eligible to be included in a list of potential contest candidates upon the recipient's indication of consent;

recording in the course of a first interactive exchange the particulars of the recipient's identity for each said recipient that has indicated said consent to be included in said list of potential contest candidates, said particulars including parts of the frequency spectrum of the recipient's speech;

initiating a second sequence of automatically executed telephone calls immediately preceding the next scheduled occurrence of said contest to first randomly selected ones on said list of potential contest candidates, each said automatically executed call of said second sequence including a second interactive exchange for verifying the identity of the telephone call receiving person, said second interactive exchange including comparisons with said particulars of each said recipient's identity collected in said first interactive exchange and a comparison with said parts of the frequency spectrum of the recipient's speech;

storing the identities of all such potential candidates as have been correctly verified by said comparison with said particulars, including a comparison with said parts of said frequency spectrum of said recipient's speech, in a roster of candidates selected for said contest; and selecting in the course of said contest a second random group from said roster of candidates for interactive telephonic participation in said contest.

11. A method according to claim 10, wherein:

said contest is a generally broadcast televised game show.

12. A method according to claim 11, wherein:

said interactive participation in said contest includes keying in selected keys on a telephone instrument in response to the questions presented in the course of said generally broadcast gaming contest.

13. A method according to claim 10, further comprising the step of:

accessing said recorded particulars for the purpose of selecting a list of recipients having one or more common characteristics.

14. A method according to claim 13, wherein:

said contest is a generally broadcast televised game show.

15. A method according to claim 14, wherein:

said interactive participation in said contest includes keying in selected keys on a telephone instrument in response to the questions presented in the course of said generally broadcast gaming contest.

16. A method according to claim 10, wherein:

said steps of initiating said first and second sequence each include automatically generating groups of words in response to one or more keying signals effected by each said recipient on the recipient's telephone instrument.

17. A method according to claim 16, wherein:

said contest is a generally broadcast televised game show.

18. A method according to claim 17, wherein:

said interactive participation in said contest includes keying in selected keys on said telephone instrument in response to the questions presented in the course of said generally broadcast gaming contest.

19. A method for combining a contest with automatically executed solicitations comprising the steps of:

initiating a first sequence of automatically executed communications to a first arbitrarily selected pool of recipients, each said automatically executed communication of said first sequence including a message informing each said recipient of the time and other particulars concerning said contest and advising each said recipient that said recipient is eligible to be included in a list of potential contest candidates upon the recipient's indication of consent;

recording the particulars of each said recipient's identity for each said recipient that has indicated said consent to be included in said list of potential contest candidates;

initiating a second sequence of automatically executed communications to first randomly selected ones on said list of potential contest candidates, each said automatically executed communication of said second sequence including an interactive exchange for verifying the identity of the communication receiving person, said interactive exchange including comparisons with said particulars of each said recipient's identity collected in said recording step;

storing the identities of all such potential candidates as have correctly verified said particulars in a roster of candidates selected for said contest; and selecting a second random group from said roster of candidates for interactive participation in said contest.

* * * * *